United States Patent
Knotten

(10) Patent No.: US 9,797,529 B2
(45) Date of Patent: Oct. 24, 2017

(54) HOSE CONNECTOR

(75) Inventor: Inge Knotten, Gursken (NO)

(73) Assignee: SAFEHOSE HOLDING AS, Gjerdsvika (NO)

( * ) Notice: Subject to any disclaimer, the term of this patent is extended or adjusted under 35 U.S.C. 154(b) by 622 days.

(21) Appl. No.: 13/119,977

(22) PCT Filed: Oct. 7, 2009

(86) PCT No.: PCT/NO2009/000347
§ 371 (c)(1),
(2), (4) Date: May 18, 2011

(87) PCT Pub. No.: WO2010/041955
PCT Pub. Date: Apr. 15, 2010

(65) Prior Publication Data
US 2011/0210540 A1    Sep. 1, 2011

(30) Foreign Application Priority Data
Oct. 8, 2008 (NO) .................................. 20084209

(51) Int. Cl.
*F16L 39/02* (2006.01)
*F16L 11/133* (2006.01)
*F16L 33/01* (2006.01)

(52) U.S. Cl.
CPC ............ *F16L 11/133* (2013.01); *F16L 33/01* (2013.01); *F16L 39/02* (2013.01); *F16L 2201/30* (2013.01)

(58) Field of Classification Search
CPC ....... F16L 33/01; F16L 37/565; F16L 39/005; F16L 39/02
(Continued)

(56) References Cited

U.S. PATENT DOCUMENTS 3,986,732 A * 10/1976 Stanley ................. F16L 39/005
141/285
4,090,539 A * 5/1978 Krupp ..................... B67D 7/54
141/198

(Continued)

FOREIGN PATENT DOCUMENTS

| CN | 2424348 Y | 3/2001 |
|---|---|---|
| RU | 2350820 C2 | 2/2006 |
| SU | 751925 A1 | 7/1980 |

OTHER PUBLICATIONS

Espacenet English abstract of RU 2,350,820 C2.
Espacenet English abstract of CN 2424348 Y.

*Primary Examiner* — Aaron Dunwoody
*Assistant Examiner* — Fannie Kee
(74) *Attorney, Agent, or Firm* — Ladas & Parry LLP

(57) ABSTRACT

An arrangement for a hose system (11) having an inner main hose (12) and an outer cover hose (13) delimiting a ring shaped air filled volume (14) to make the hose buoyant in water. At least at one end there is a connector (15) attached to the main hose as well as the cover hose, and which at its free end is attached to, or integrated with, a connector part (16) for connection of the hose system (11) to an external system. The connector (15) includes an inner sleeve (22), to which the end of the main hose (12) is attached to, as the inner sleeve (22) by its free end (26) is equipped with an element, in particular threads, for connection to a pipe system, an outer sleeve (16) to which the end of the cover hose is attached, a connector element (30) for connecting the inner sleeve (22) detachably to the outer sleeve (16), and a connection between the two hose parts (12, 14) having a one way valve which allows draining of the outer hose (14) to the main hose (12).

8 Claims, 2 Drawing Sheets

(58) Field of Classification Search
USPC ..... 285/120.1, 123.1, 123.6, 123.12, 123.15,
285/124.1, 222.1–222.5, 239, 241–242,
285/248, 256
See application file for complete search history.

(56) References Cited

U.S. PATENT DOCUMENTS

| | | | |
|---|---|---|---|
| 4,111,466 A * | 9/1978 | Deregibus | B63B 27/24 |
| | | | 285/123.14 |
| 4,763,683 A * | 8/1988 | Carmack | F16L 37/32 |
| | | | 137/594 |
| 5,203,384 A * | 4/1993 | Hansen | 141/59 |
| 5,265,652 A * | 11/1993 | Brunella | 141/59 |
| 6,085,796 A | 7/2000 | Riga | |
| 6,349,976 B1 | 2/2002 | Taylor, Jr. | |
| 6,634,387 B1 | 10/2003 | Glejbol | |
| 2006/0000515 A1 | 1/2006 | Huffman | |
| 2011/0210540 A1 | 9/2011 | Knotten | |

* cited by examiner

HOSE CONNECTOR

BACKGROUND OF THE INVENTION

The invention concerns a hose connector.

Hoses that are able to float in the water are being used in transfer of pumpable fluids offshore, such as refueling of platforms from supply boats or transfer of mud from a platform to a supply boat. In this purpose it is known to attach floating devices to ordinary hoses or to attach tubular mantles of foam material to the hoses. Both of these hose constructions provide buoyancy but do not increase the safety. Moreover, this is not a suitable way to provide a wear resistant hose.

In connection with increased focus upon the pollution problems from a spill, a need for safety measures beyond hose upsizing has arisen.

Hoses have been proposed wherein the object of the outer hose has been to accommodate leakage from the internal main hose. Safety hoses of this type have enabled production of hoses that are able to float in water. But the main objective of establishing safety has prevented development of a satisfactory floating hose. For example U.S. Pat. No. 6,085,796 (Riga, 2000) describes a composite safety hose having an internal and external hose, which has been provided for hydraulic systems, having a low transport capacity. The design of the end connectors has not been satisfactory.

There is also known a double pipe having a foam material in the outer annulus in order to establish thermal insulation among other things. A structure of this type is known from U.S. Pat. No. 6,349,976 (Mentor Subsea, 2002), but neither has this one been suitable as a floating hose.

SUMMARY OF THE INVENTION

The main objective of the invention is to provide a floating hose which is adapted to rational production and having good utilization potential. Moreover, it should enable surveillance of leakage of hose content and enable collection of the content from an initiating leakage.

Another objective is to provide such a composite hose which makes replacement of hose parts at leakage easier and less expensive.

It is also an objective to provide a hose which enables a simple coiling with flattening of the external hose.

Other objectives will appear from the following example description.

The invention is directed to a hose device having an internal main hose and an external cover hose which define a tubular air interstice primarily with the purpose to provide buoyancy to the hose in water, and a connector at one or more ends, establishing attachment for the main hose and the cover hose, and which at its free end is connected to or integrated with a connector device for connection of the hose structure to an external connection. This connector comprises:

an internal sleeve in which the end of the main hose is inserted and attached, wherein the internal sleeve at its free end exhibits means, particularly threads, for connection to a pipe system, an external sleeve with the end of the cover hose anchored, a connector to connect the internal sleeve releasable with the external sleeve, and a connection between the two hose parts having a check valve which allows emptying of the hose part to the main hose.

BRIEF DESCRIPTION OF THE DRAWINGS

The invention is illustrated in the drawings, wherein

FIG. 1 shows an axial side view in a partial cross section of a device formed in accordance with the invention, whereas

DESCRIPTION OF THE PREFERRED EMBODIMENTS

Figure 1:
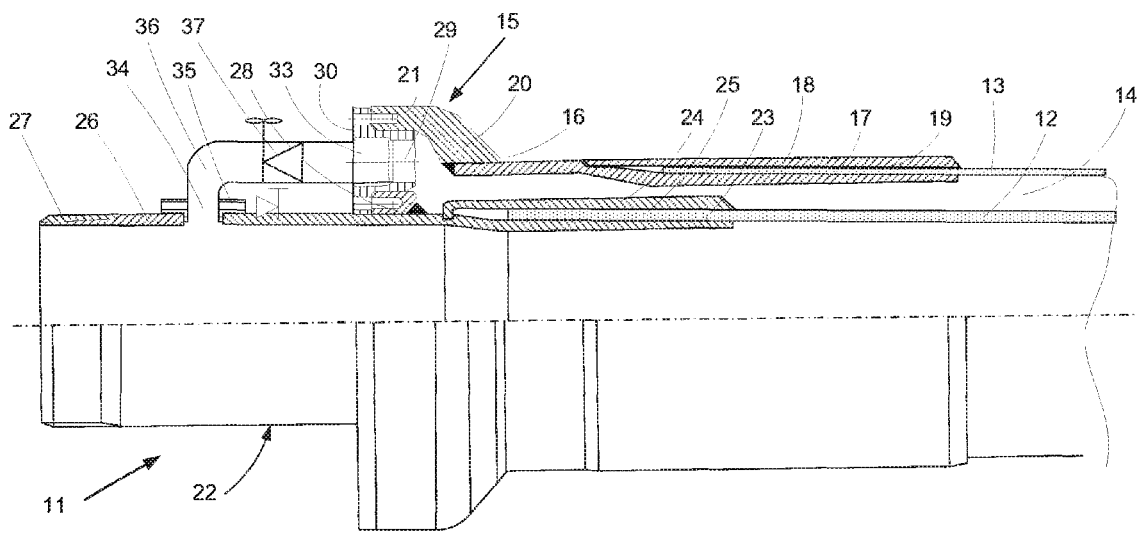
Figure 2:
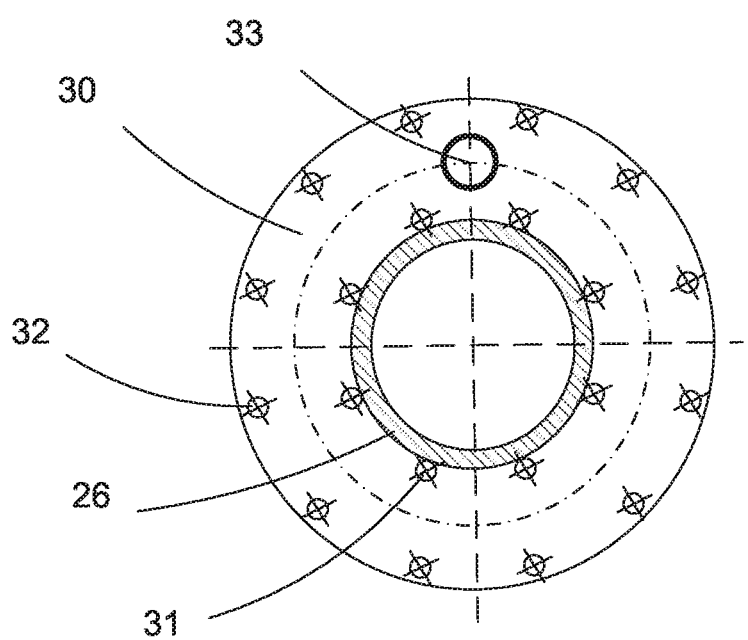
FIG. 2 illustrates an end view of the connector device of FIG. 1.

FIG. 1 shows the end of a composite or "compound" hose device 11 formed in accordance with the invention. The main element is an internal main hose 12 which may be designed to transfer bunker fuel, mud or other pumpable fluids between two units which are separated by water, which requires the hose to be placed on the water surface.

The main hose 12 is surrounded by a cover hose 13, which may have a diameter that establishes a tubular interstice 14 between the two hoses. The interstice 14 will be filled with air in order to reduce the weight of the composite hose, so that the hose can stay afloat on water. But it may also be filled with another gas or partially or completely filled with a foam material. In an alternative embodiment, in order to maintain a distance between the main hose 12 and the cover hose 13, spacers such as tubular wave profiles can be arranged within the interstice 14.

A connector 15 is arranged at each end or at any joints in order to connect the main hose 12 and the cover hose 13, made up as described in the following.

In the example in the figures, the connector 15 comprises an external end connector 16 for the cover hose 13. The external end connector 16 comprises two coaxial end sleeves 17, 18 which there between define an annular slit 19 for the end of the cover hose 13. The end connector 16 has at its free end an annular extension 20 having a pipe fitting 21 at the end.

Moreover, the connector 15 comprises an internal end connector 22 for the main hose 12. The internal end connector 22 comprises in a manner similar to the external end connector 16, two coaxial sleeves 23, 24 which define an annular slit 25 for the end of the main hose 12. The two hoses 12 and 13 may be fastened within the respective annular slits 25 and 19 in a manner known per se with hydraulic press equipment.

In one embodiment, at least one of the external end connector (16) or the internal end connector (22) comprises a flange formed connector ring. In another embodiment, the connector element 15 comprises an external and an internal bevel.

The internal end connector 22 is extended out to a tubular end 26 having threads 27 at the free end. In the area of the tubular end 26 which in a connected situation is supposed to lie within the extension 20, a ring or grommet 28 is level with the pipe fitting 21. An annular slit 29 is formed between these two parts.

This annular slit is in the example closed by a ring 30 which is threaded in a sealing manner to the pipe fitting 21 and the ring 28 by two screw rows 31 and 32. At the same time the ring 30 will lock the two parts of the connector 15 to each other. The ring 30 exhibits a threaded aperture 33 for pipe connection. Moreover, the tubular end 26 has a radial aperture 34 having a connector flange 35. During use of the composite hose, a pipe or hose connection 36 with a check valve 37 is connected between the aperture 33 and the aperture 34. The purpose of this connection is to empty the interstice 14 with regard to air and any liquid leakage during coiling. In this way pollution is prevented at the same time as hose handling is made more convenient.

The invention is primarily suitable for making a floating hose that can be used in numerous offshore applications having better total properties with regard to safety and use than known hoses for a similar purpose. It is of particular importance that the composite hose can be used in a safety regard, both to register leakage in a main hose and to collect such a leakage.

The invention claimed is:

1. A hose device comprising:
an internal main hose having a unitary hose body;
an external cover hose;
wherein the internal main hose and external cover hose define a tubular interstice to provide buoyancy to the hose device in water; and
a connector connecting the internal main hose and the external cover hose;
wherein a free end of the connector is connected to, or integrated with, a tubular end for connecting the hose device to an external connection;
wherein the connector comprises:
an internal end connector in which an end of the internal main hose is inserted and attached, wherein a free end of the internal end connector comprises a connecting means for connection to a pipe system,
an external end connector with an end of the external cover hose attached thereto,
a separate, ring shaped connecting element directly and releasably connecting the internal end connector with the external end connector, and
a connection between the internal main hose and the external cover hose, said connection comprising a check valve configured to allow emptying of the interstice to the internal main hose.

2. The hose device according to claim 1, wherein the connecting element is tubular and is releasably connected to at least one of the two end connectors.

3. The hose device according to claim 2, wherein at least one of the two end connectors comprises a flange formed connector ring.

4. The hose device according to claim 1, wherein the connecting element comprises one or more holes for connection of a pipe connection to the interstice between the internal main hose and the external cover hose.

5. The hose device according to claim 1, wherein the connecting element comprises an external and internal bevel.

6. The hose device according to claim 1, wherein the means for connection to a pipe system comprises threads.

7. The hose device according to claim 1, wherein the interstice is filled with air.

8. The hose device according to claim 1, wherein the interstice is partially or wholly filled with a foam material.

* * * * *